No. 752,888. PATENTED FEB. 23, 1904.
H. DE HAVEN.
BALE TIE.
APPLICATION FILED APR. 3, 1903.
NO MODEL.

Witnesses
C. Mitchell
H. M. Vitchings

Hugh De Haven Inventor
By his Attorney W. P. Preble Jr.

No. 752,888. Patented February 23, 1904.

UNITED STATES PATENT OFFICE.

HUGH DE HAVEN, OF NEW YORK, N. Y.

BALE-TIE.

SPECIFICATION forming part of Letters Patent No. 752,888, dated February 23, 1904.

Application filed April 3, 1903. Serial No. 150,866. (No model.)

*To all whom it may concern:*

Be it known that I, HUGH DE HAVEN, a citizen of the United States, and a resident of the borough of Brooklyn, county of Kings, city and State of New York, have invented certain new and useful Improvements in Bale-Ties, of which the following is a specification.

The object of my invention is to provide a bale-tie more particularly intended for use on cotton-bales, and which shall be of strong and simple construction, adapted to be applied quickly and easily, and to hold a bale-strap made of cheap soft metal.

One form of my invention is shown in the accompanying drawings, in which—

Figure 1:
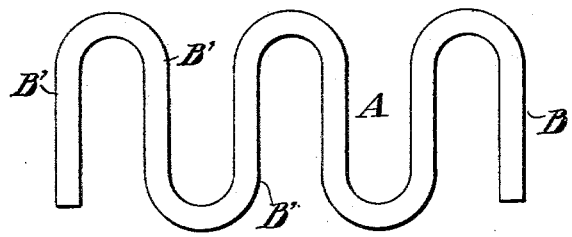
Figure 2:
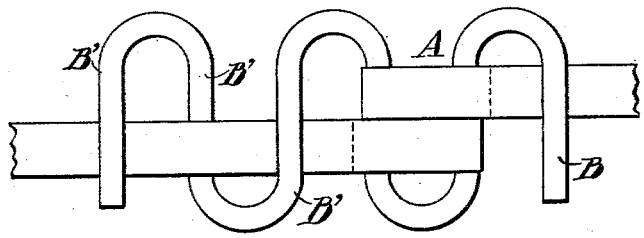
Figure 3:
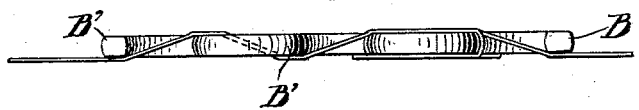
Figure 4:
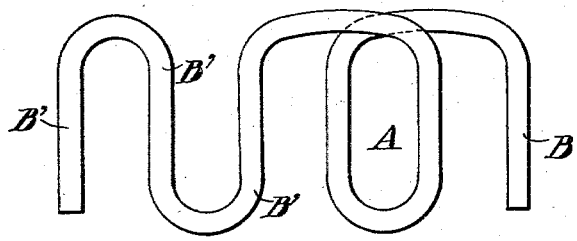

Figure 1 is a top view of the tie without the strap. Fig. 2 is a top view showing the strap threaded into it. Fig. 3 is an end view. Fig. 4 is a modification.

Same letters indicate similar parts in the different drawings.

This bale-tie is preferably made of wire, round or flattened, and of a gage adapted to the work required, and consists, essentially, in forming a series of loops or bends serving as fingers. The spaces between the fingers are open at one end to aid the threading of the strap.

The central loop or main loop A is designed to receive both ends of the bale-strap, one end crossing the other, as shown in Fig. 3, while the other fingers or loops receive alternately a portion of the bale-strap above or below them. For practical purposes a single bend each side of the main finger will be found sufficient, but for added safety I prefer to have two or more bends on each side of the main loop. In the drawings I have shown one loop or bend B on one side of the main loop A and three bends B' on the other side; but it is to be understood that the number is not material, all that is necessary being that the two ends of the strap should be threaded in and out a sufficient number of times to secure an effective grip when turned back upon themselves, as shown in Fig. 3.

The method of threading is this: One end of the strap is passed under the bend B up and over the loop A down around the farther side of said loop and back under the loop where it lies flat against the bale. The other end of the strap is passed around the bale and brought under the first bend B' over the second, under the third over the loop A down and back under the loop A, where it lies against the bale adjacent to the first end of the strap.

Other methods of threading may obviously be adopted, if preferred.

I claim—

A bale-tie which consists of a piece of wire bent back and forth so as to form a series of simple loops open at their rear ends; the main loop being adapted to receive both ends of the bale-strap, and the adjacent bends of the wire on each side of the main loop being adapted to have the free opposite ends of the bale-strap pass under and over them so as to lie under and be pressed by the main body of the bale-strap.

HUGH DE HAVEN.

Witnesses:
W. P. PREBLE, Jr.,
HELEN M. HUTCHINGS.